INVENTORS
Thomas R. Baker
Sigurd J. Hoyrup
Boris S. Posen

INVENTORS
Thomas R. Baker
Sigurd J. Hoyrup
Boris S. Posen
BY Howard G. Russell
their ATTORNEY

United States Patent Office 3,452,855
Patented July 1, 1969

3,452,855
CONVEYING DEVICE FOR ACCELERATING AND TIMING ARTICLES
Thomas R. Baker, Los Altos, Sigurd J. Hoyrup, Monta Vista, and Boris S. Posen, Los Altos, Calif., assignors to Kliklok Corporation, New York, N.Y., a corporation of Delaware
Filed May 3, 1966, Ser. No. 547,366
The portion of the term of the patent subsequent to Nov. 13, 1984, has been disclaimed and dedicated to the public
Int. Cl. B65g 47/30
U.S. Cl. 198—34                     6 Claims

ABSTRACT OF THE DISCLOSURE

The present improvements provide a conveying device for the spacing, timed release and acceleration of articles, such as folding boxes, in which the articles are frictionally driven along a track by a bottom conveyor and are intercepted by lugs of two slower moving timing conveyors, which lugs alternately extend into the track from opposite sides. The number of lugs exposed to the track never exceeds three, and an outfeed conveyor moving faster than the bottom conveyor overlaps the latter at a point beyond the release of the articles by the timing conveyors.

---

This invention relates to the art of packaging and is concerned with the conveying of receptacles, such as folding boxes or trays, in continuous motion and in timed and spaced sequence to, and past, a station at which a particular operation is to be performed.

The operation may be the filling of a box or tray with merchandise, but it may also be the closing or wrapping or imprinting of a box, or any of the various other operations performed in the course of a packaging operation.

The prior patent to Lefief 2,840,224 discloses and claims forms of conveying devices of the aforementioned type, and the present invention is directed to certain refinements and improvements.

In the packaging of frozen foods, as in the packaging of other merchandise, it is necessary from time to time to change from one size of receptacle to another. For example, there may be a change from a folding box of a certain width or length to a box of a different width or length. As changes in width affect the width of the path or track along which the box travels, and as changes in the length have a bearing on the spacing of the conveyor lugs which handle the boxes, it is desirable to provide a conveying device which can rapidly be adjusted from one box size to another. The present invention provides such a device.

Changes in box dimensions may produce quite unexpected irregularities in the handling of the boxes. It was experienced, and it can be demonstrated geometrically, that changes in box size which appear to be quite within the range of the capacity of a certain conveying device will cause, for example, a pocket or space of an outfeed conveyor to be skipped occasionally so that it remains vacant. If the device fails to feed a receptacle to a loading station, the discharge of product into the vacant space may lead to an operational disturbance. At the least, it is an undesirable occurrence.

The present invention provides improvements which positively prevent skipping of a conveyor pocket or space, as long as boxes are available to the conveying device.

These and other objects, features and advantages of this invention will appear more fully from the detailed description which follows accompanied by drawings showing, for the purpose of illustration, a preferred embodiment of the invention. The invention also resides in certain new and original features of construction and combination of elements hereinafter set forth and claimed.

Although the characteristic features of this invention which are believed to be novel will be particularly pointed out in the claims appended hereto, the invention itself, its objects and advantages, and the manner in which it may be carried out may be better understood by referring to the following description taken in connection with the accompanying drawings forming a part of it in which:

Figure 1:
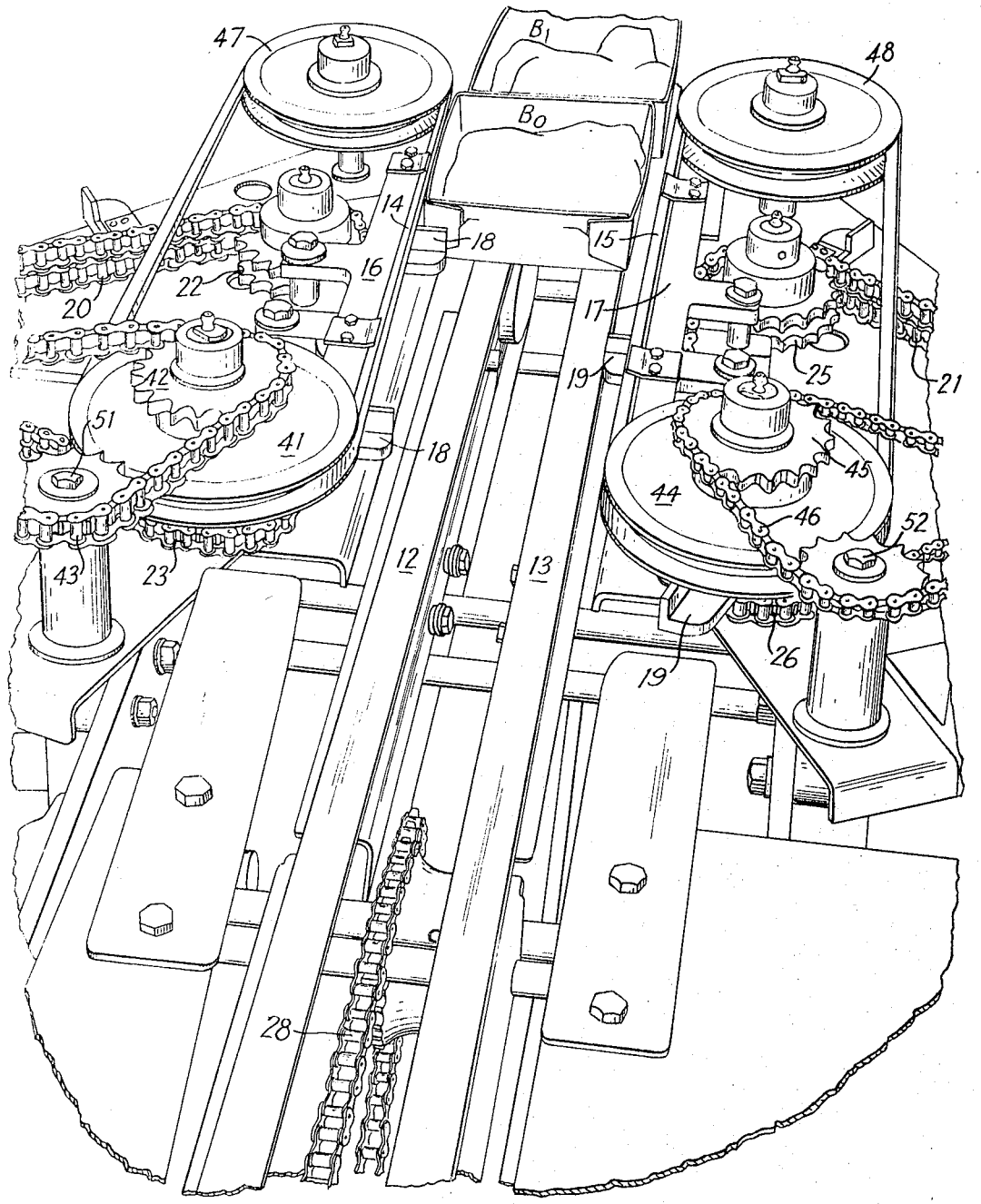
FIG. 1 is a perspective view from above of the receiving end of the conveying device.

In the following description and in the claims various details will be identified by specific names for convenience. The names, however, are intended to be generic in their application. Corresponding reference characters refer to corresponding parts in the several figures of the drawings.

The drawings accompanying, and forming part of, this specification disclose certain specific details of the invention for the purpose of explanation of broader aspects, but it is understood that the details may be modified in various respects without departure from the principles of the invention and that the invention may be applied to other structures than the one shown.

Figure 9:
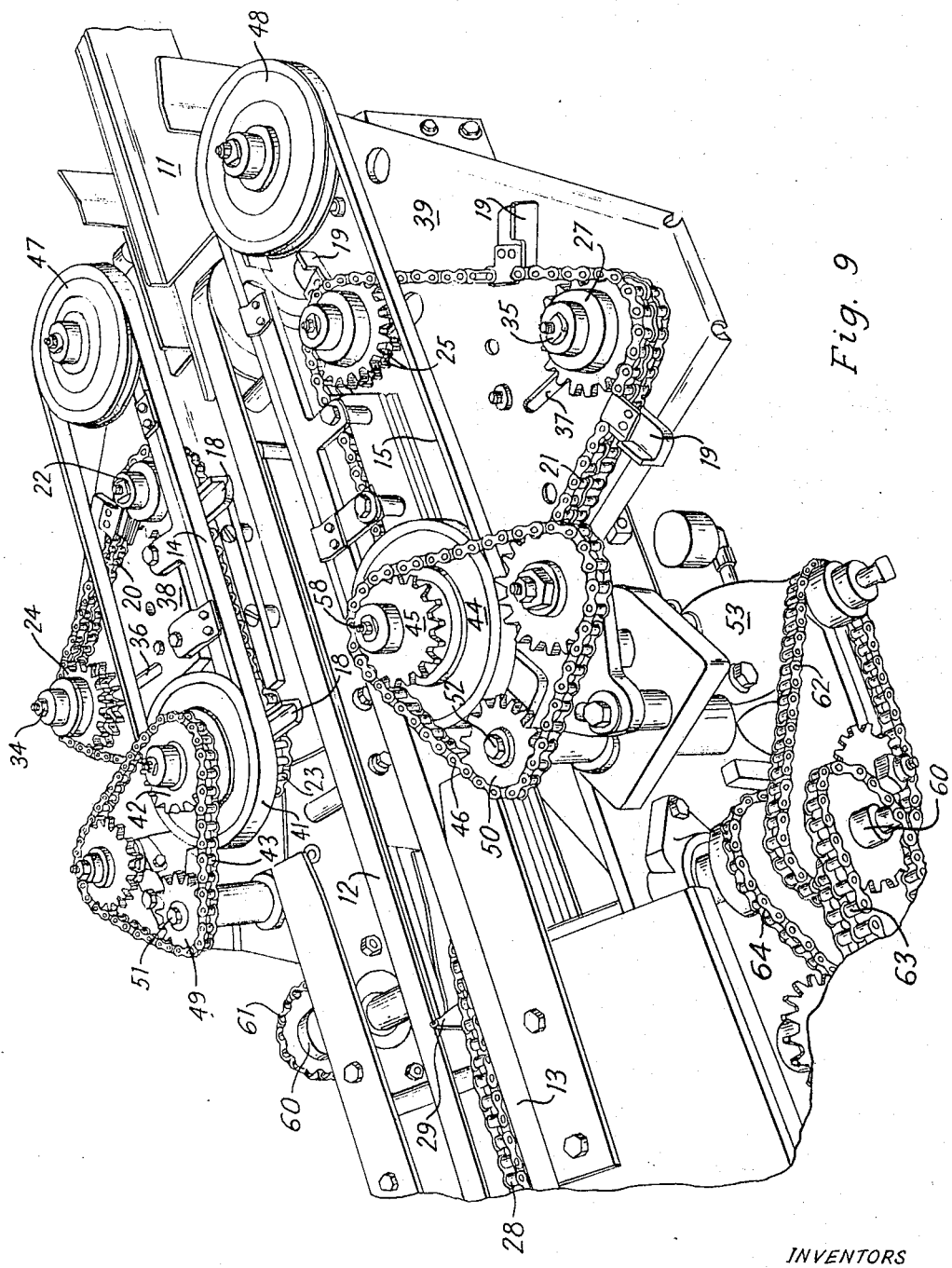
FIG. 9 is a perspective view of the conveying device showing all the essential elements of its drive mechanism.

Referring to FIG. 1 a row of filled folding boxes $B_0$, $B_1$, $B_2$, etc. arrive at the conveying device untimed and unspaced, for example by way of a chute 11 which is best seen in FIG. 9, and are frictionally engaged at their bottoms by a pair of belts 12 and 13 running at the same linear velocity towards the observer. The box path or track is laterally limited by suitable lateral guides which may be metal rails or plates, but which are preferably a pair of endless belts 14, 15 backed up against deflection towards the outside by belt guides 16, 17. The provision of guide means in the form of endless belts 14, 15, driven at a predetermined velocity in relation to other elements, is the subject matter of an improvement by William E. Blake claimed in an application Ser. No. 564,584 resulting in United States Patent 3,352,403, dated Nov. 14, 1967. The lateral box guide elements, in the illustrated embodiment the belts 14, 15, are so adjusted as to define between them a box track of a width equal to the width of the box plus the distance by which one of the conveyor lugs 18, 19 protrudes into the track. This dimensional relationship is particularly well visible in FIG. 2.

The lugs 18 and 19 are carried by chains 20, 21 of timing conveyors. These timing chains run preferably on a triangular course by reason of being trained around three sprocket gears 22, 23, 24 for chain 20 and 25, 26, 27 for chain 21. The sprocket gears 24 and 27 are not visible in FIGS. 1 to 6, as they lie outside the boundaries of the illustrations but are shown in FIG. 9.

The reason for the triangular course of the conveyors will be explained later. Suffice it to state at this point that the base of each triangle is parallel to the path of the bottom conveyor 12, 13 and parallel to the center line of the box track defined by the lateral guide elements 14, 15.

The linear velocity of the bottom conveyor 12, 13 is greater than the linear velocity of the timing conveyors 18, 20; 19, 21. As a result, the first box $B_0$ moves against one of the timing lugs, which happens to be a lug 18 of the left conveyor chain 20 in the illustrated instance.

In order to make certain that each box runs into one or the other of the timing lugs 18 or 19, the lugs are staggered so that one lug at one side becomes a movable indexing stop for a particular box, while the next lug on the other side pushes the box over towards the one side to enforce the engagement with the indexing stop.

Figure 2:
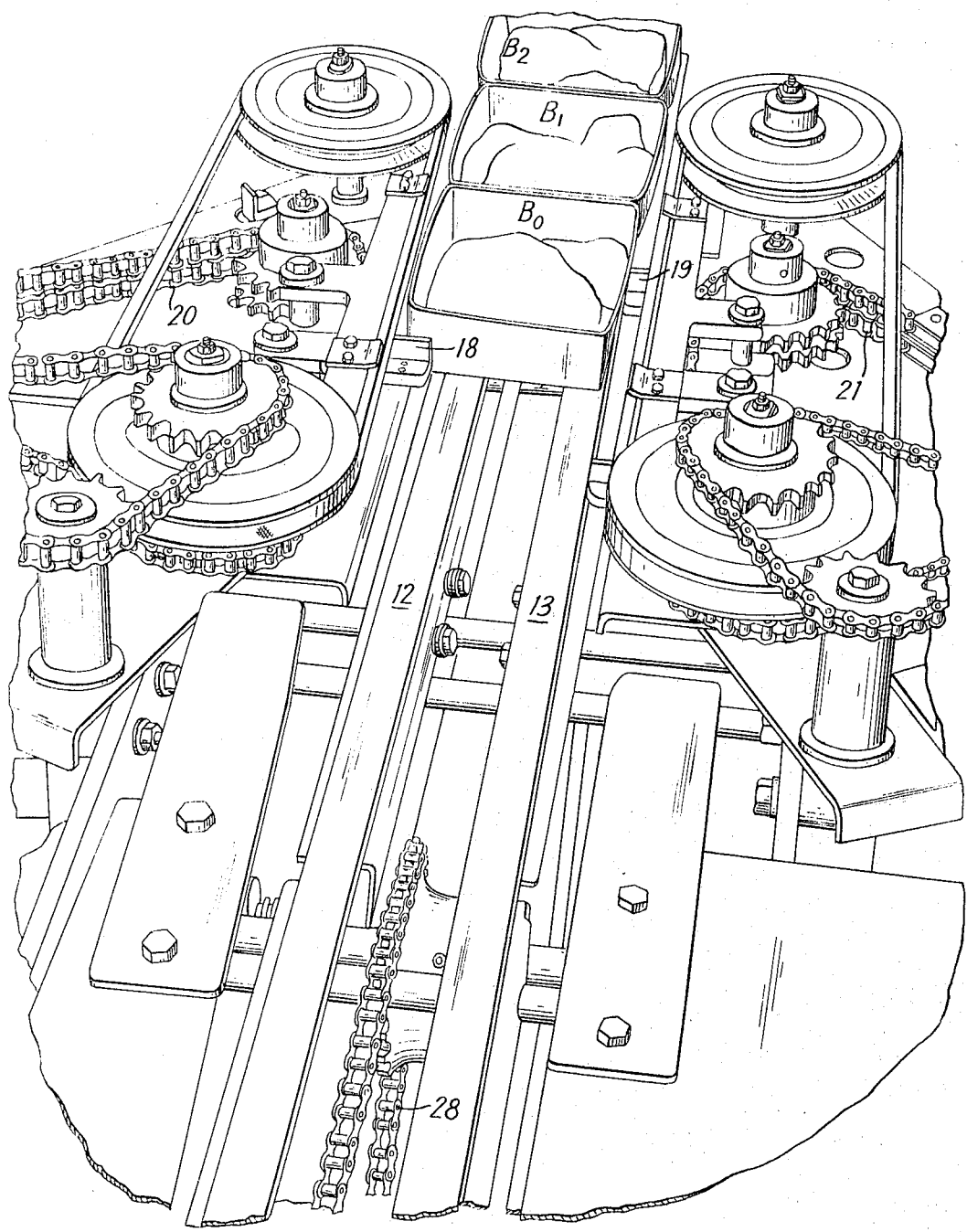
FIGS. 2 to 6 are perspective views of the device illustrating successive phases of operation, all the views 1 to 6 being "upstream"

This is particularly well visible in FIG. 2 where lug 19 forces the box $B_0$ over to the left, so that lug 18 becomes the indexing stop for box $B_0$. Succeeding illustrations will show that the next box $B_1$ will be displaced to the right, box $B_2$ to the left and so forth.

The spacing of the lugs of any one lateral conveyor is such that the distance 18—18, or 19—19 is greater than the box length, but less than double the box length. The reasons for this arrangement will be discussed later in connection with the velocities of the several lugs, chains and belts.

The foregoing makes it clear that the box $B_0$ travels towards the observer at a velocity equal to that of the chain 20 and its lugs (considering the lug velocity on a straight path). The bottom conveyor 12, 13 moves slightly faster, thus maintaining box $B_0$ tightly against lug 18.

Figure 3:
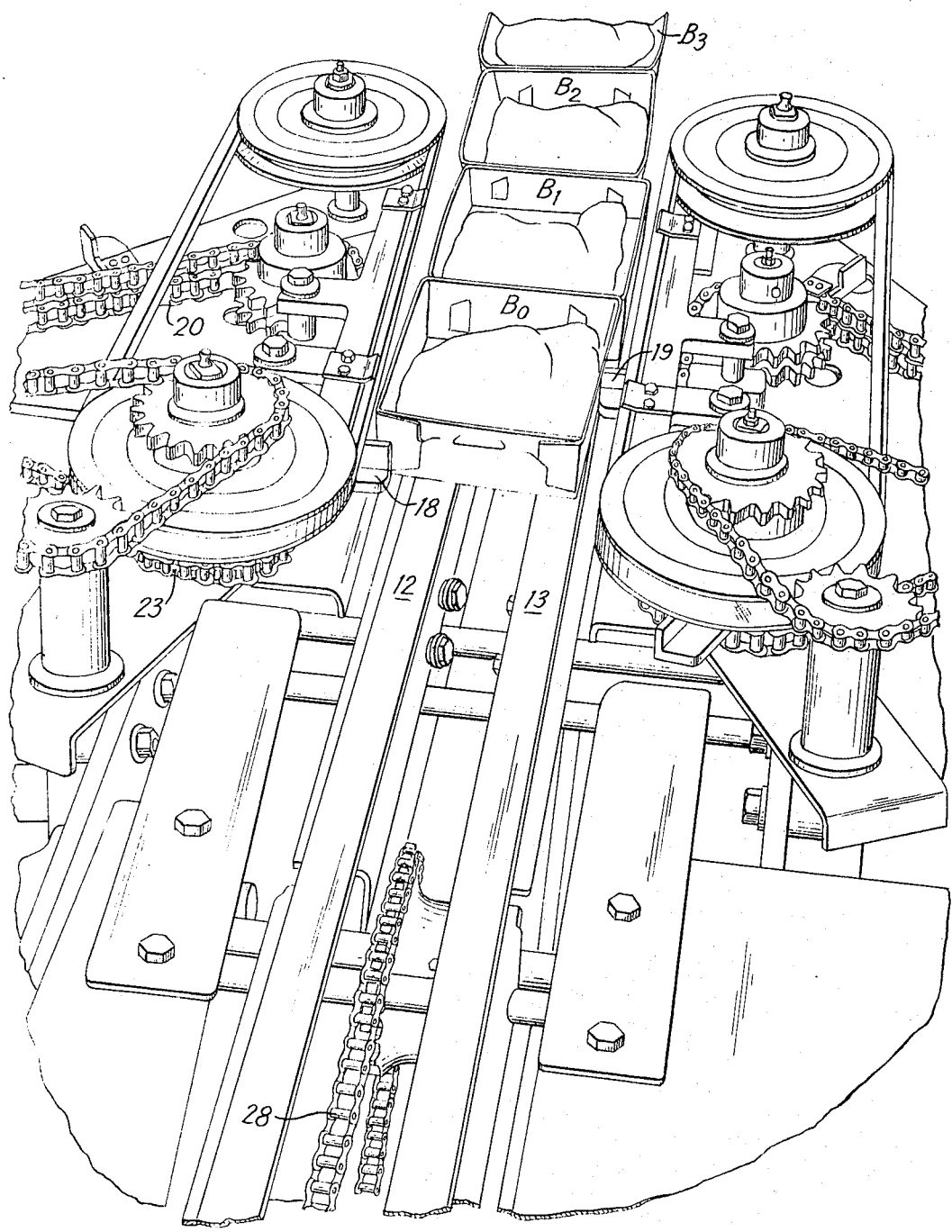

In the position shown in FIG. 3 the lug 18 is about to enter a curved path around the sprocket gear 23 and out of the box track in order to release box $B_0$. Box $B_1$ is tight against the end of box $B_0$, but it will be noticed that the right lug 19 is some distance in front of box $B_1$ and the latter must catch up with the lug 19 in order to be released thereby at the properly timed moment.

Figure 4:
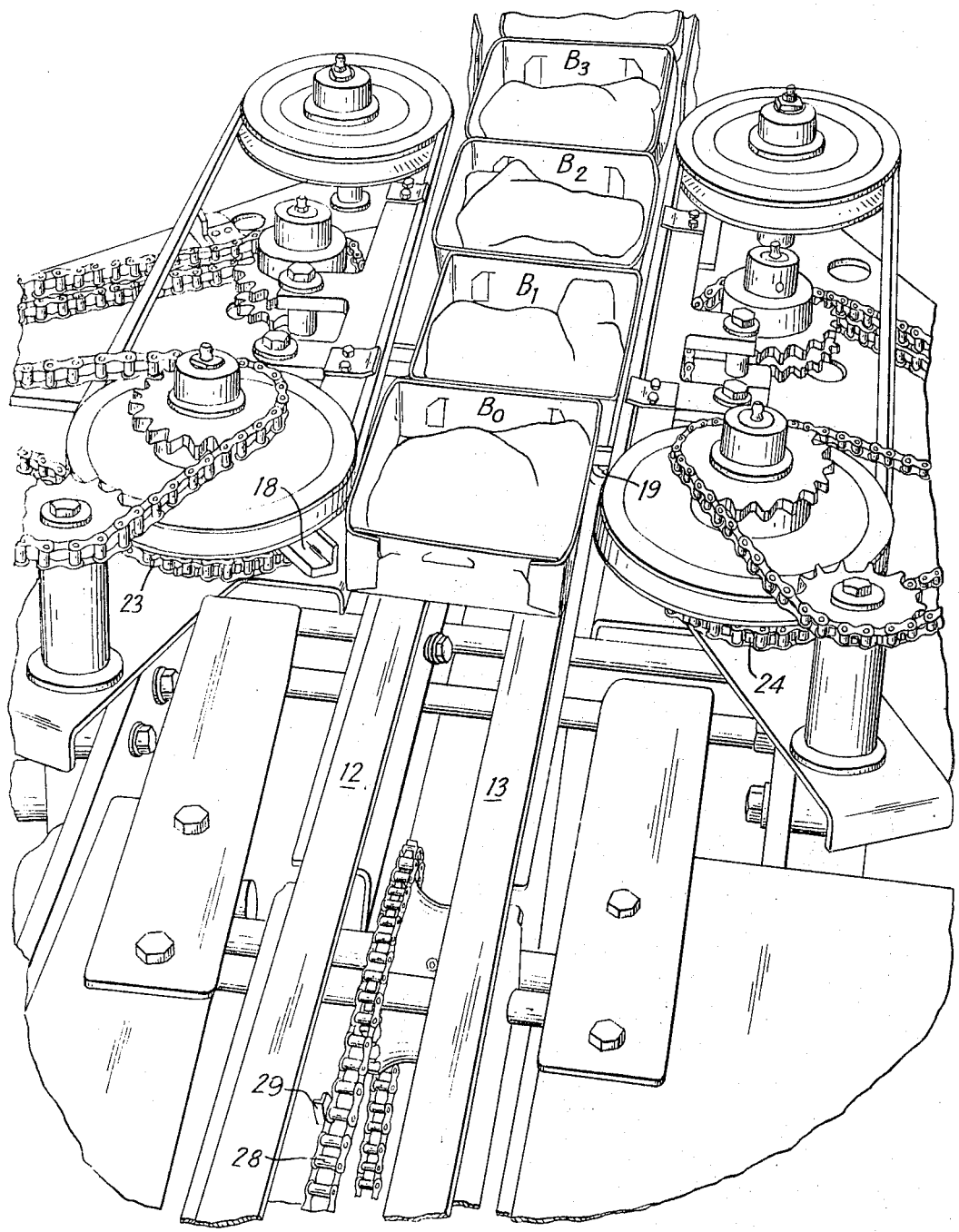

When the lug 18 moves out of the box track its velocity temporarily increases, as it moves on an arc of larger radius than its chain 20. The accelerated lug thus lifts off the leading wall of the box and the box continues to travel at the velocity of the bottom conveyor. This is illustrated in FIG. 4. It should be noted that the lug 18 does not pull laterally away from the box, but that it lifts itself off, thereby avoiding a deflection of the box $B_0$ to the right of the box track (viewing the deflection with respect to the box travel along its track).

Figure 5:
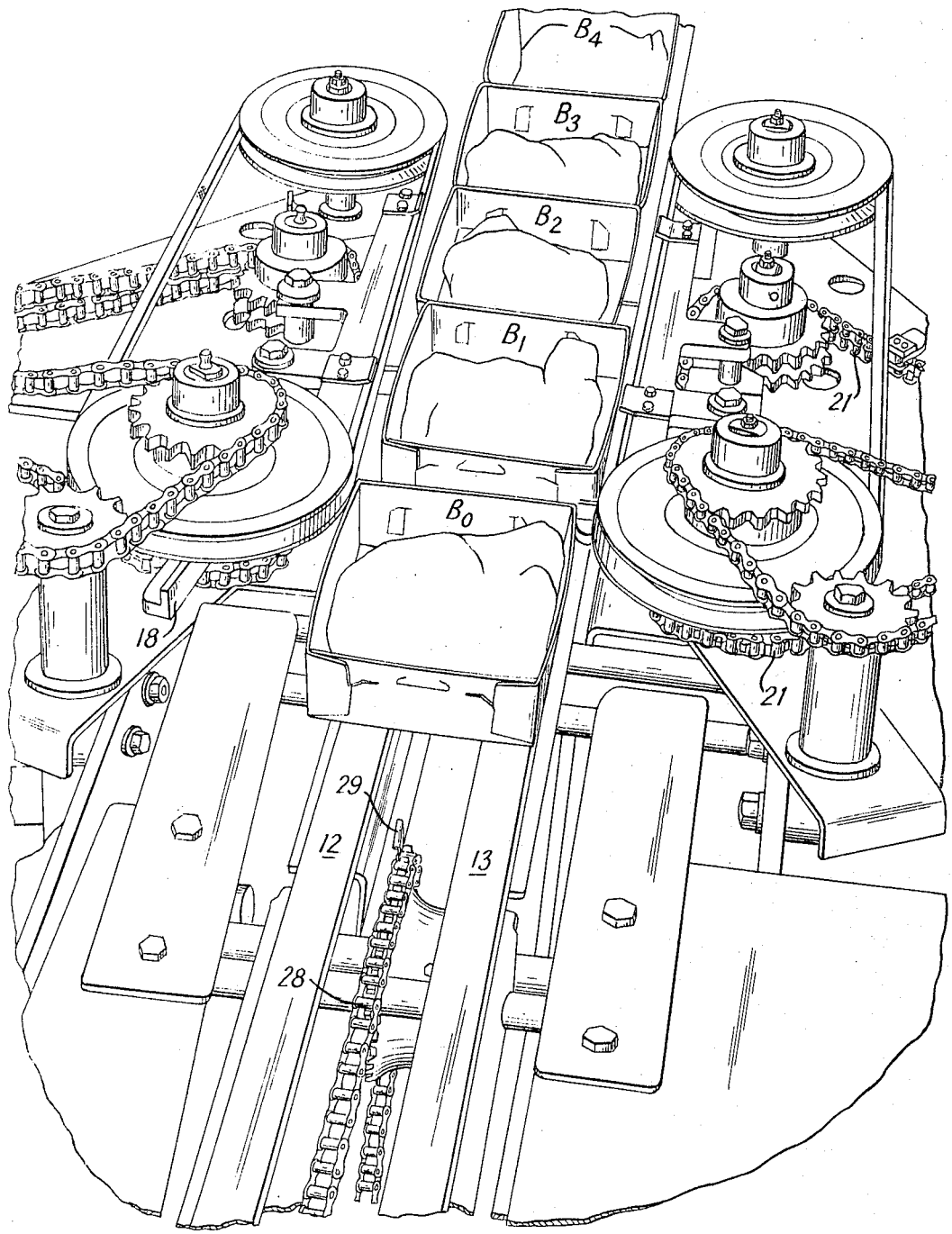

The box $B_0$ is now carried by the bottom conveyor 12, 13 to the velocity of the conveyor. Box $B_1$ follows until it is arrested by the lug 19 of the timing conveyor 21, whereafter a separation takes place between the boxes $B_0$ and $B_1$ (FIG. 5).

Figure 6:
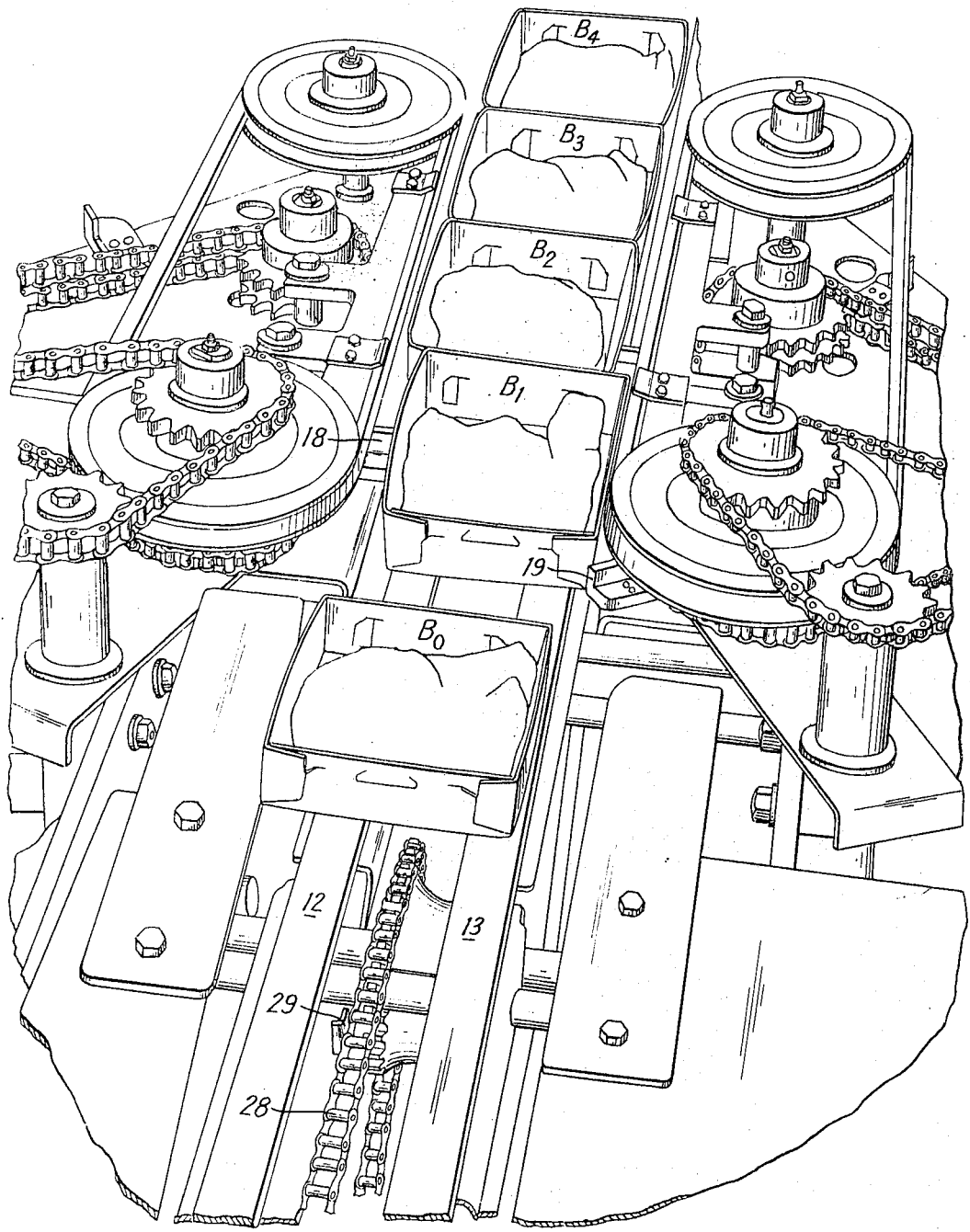

In the position shown in FIG. 6 the lug 19 is withdrawing from the box $B_1$, whereafter $B_1$ follows $B_0$ at a predetermined interval. Release of the box $B_1$ causes box $B_2$ to advance into contact with the next lug 18 and the operation is repeated. Box $B_2$ then assumes about the position of $B_1$ in FIG. 3.

The timed and spaced boxes move toward the observer into engagement with a further conveyor which times and spaces the boxes even more accurately and performs its function positively, i.e., without dependence on frictional advancement.

Figure 7:
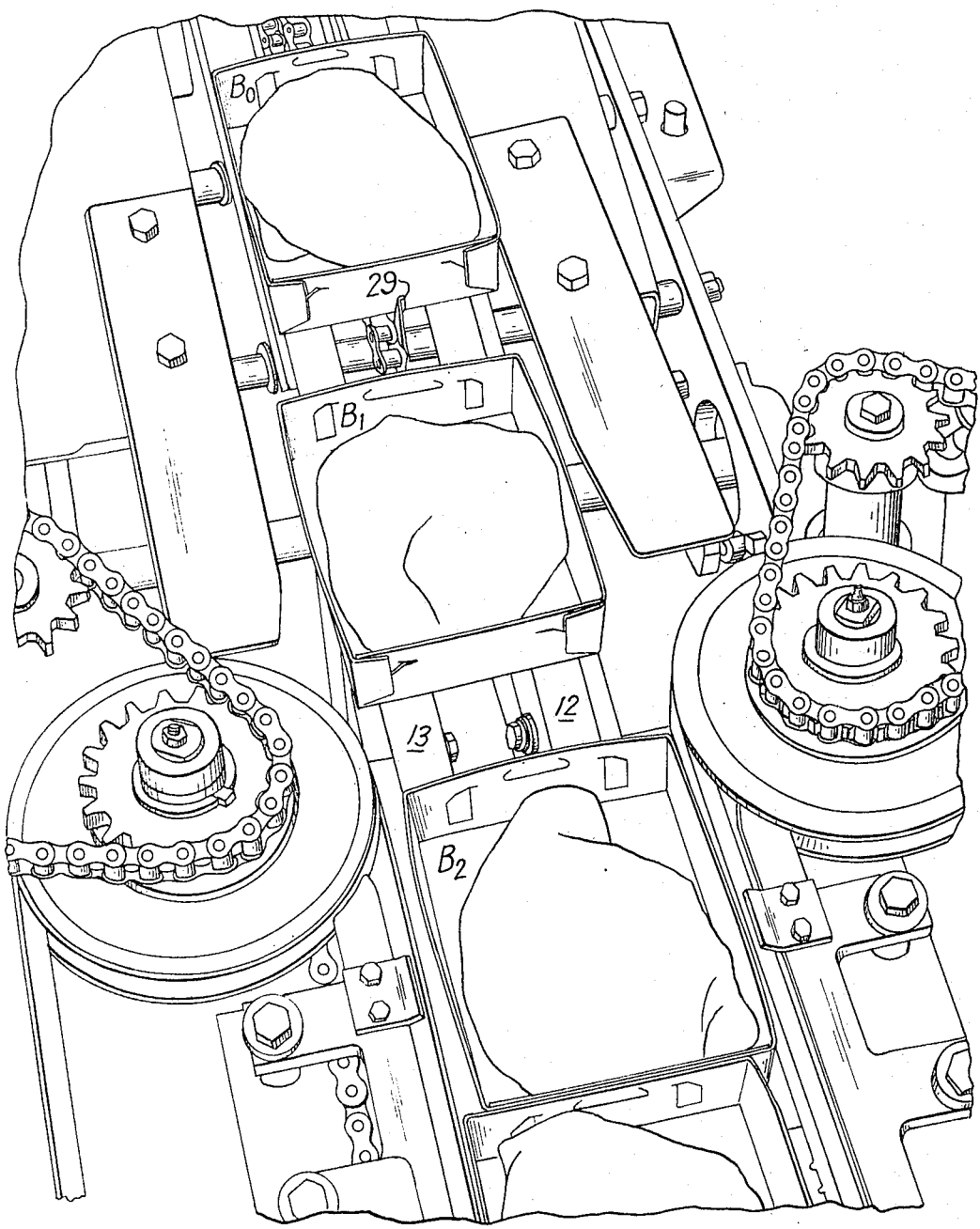
FIG. 7 is a perspective "downstream" view of the device showing boxes carried away in spaced relationship.

The outfeed conveyor 28 is seen in FIGS. 1 to 6 and carries lugs 29 (FIGS. 4 and 6) adapted to engage the trailing wall of the boxes. The outfeed conveyor travels at a higher linear velocity than the bottom conveyor 12, 13. Its lugs 29 accordingly catch up with the separated boxes and carry them away, for example, to a box closing and sealing mechanism. FIG. 7 is a view looking downstream and shows lug 29 in engagement with box $B_0$.

Figure 8:
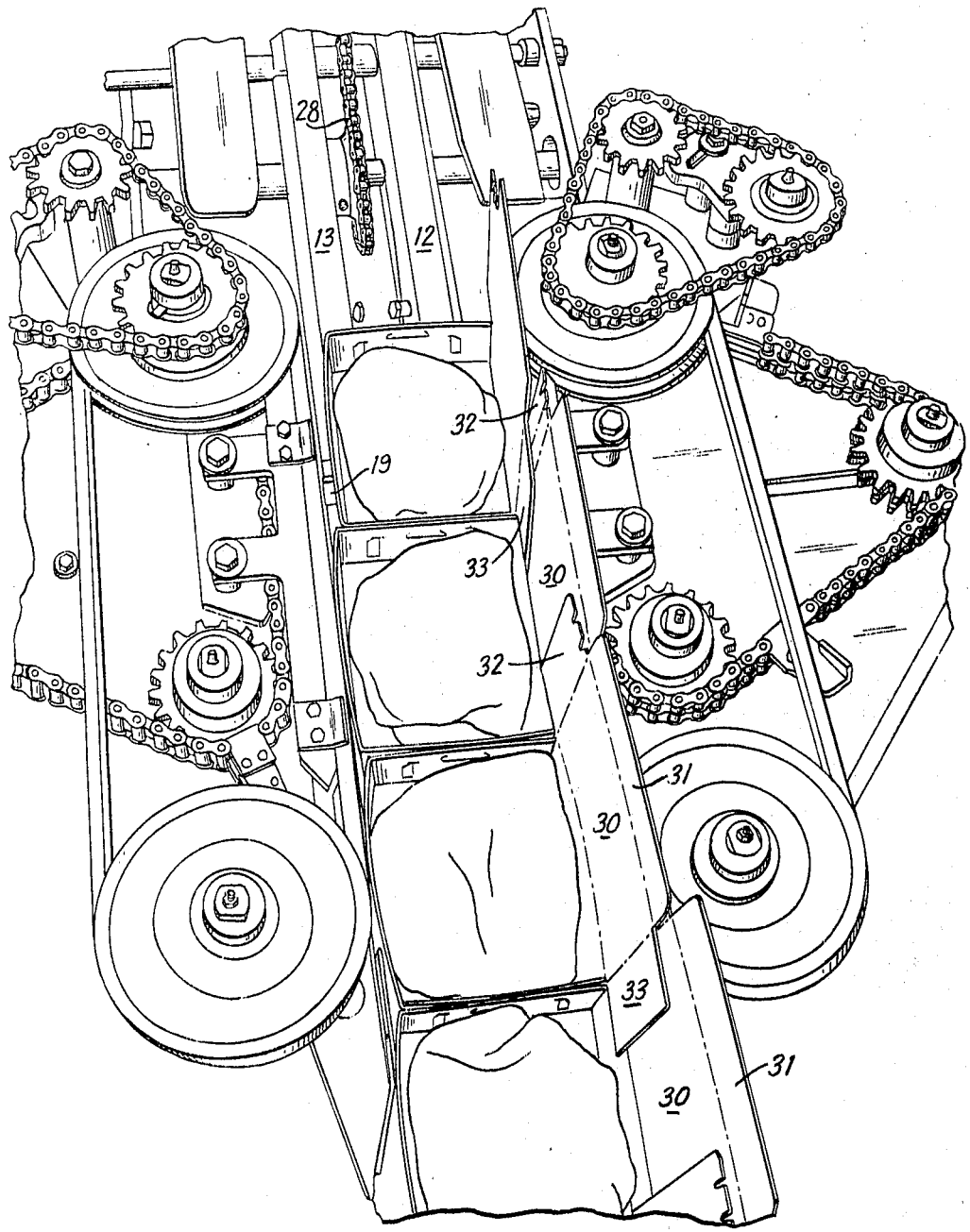
FIG. 8 is a perspective view from above illustrating the operation of the conveying device on folding boxes whose covers are irregularly entangled.

For the sake of clarity the boxes are shown without their hinge covers in FIGS. 1–7. The covers were cut off to expose machine details. In actual practice the boxes may have hinge covers, as shown in FIG. 8. The illustrated hinge covers comprise a main panel 30 to which a front flap 31 and side flaps 32, 33 are articulated. When the boxes are crowded end to end the covers become entangled, because the leading cover side flap 32 overlaps the trailing flap 33 of the next box and even a portion of its main panel 30.

This entanglement of the cover panels, however, does not prevent the boxes from shifting laterally under the action of the timing lugs. The first box on the left, for example, is clearly displaced by the action of the lug 19, even though its trailing flap 33 lies in front of the flap 32 of the next box. The cover panels and flaps simply flex under the force exerted upon the box by the timing lugs (19 in this instance).

With the benefit of the understanding of the operation of the conveying device, it will now be easy to trace its operating mechanism while referring to FIG. 9 showing the device without boxes.

The triangular course of the timing chains 20 and 21 is readily seen, as are the three sprocket gears 22, 23, 24 and 25, 26, 27 around which the conveyors are trained.

The shafts 34, 35 of sprocket gears 24 and 27 are adjustably mounted in slots 36, 37 cut in base plates 38 and 39 of roughly triangular shape. The shafts 34, 35 are clamped in adjusted position by means of knurled hand operable nuts, such as 40 seen in FIG. 10, which is a view of the underside of base plate 39.

Sprocket gears 22 and 24 of chain 20 and sprocket gears 25 and 27 of chain 21 are idler gears, whereas the remaining gears 23 and 26 (best seen in FIG. 1) are power driven.

Sprocket gear 23 is the bottom unit of a stack comprising sprocket gear 23, driving belt pulley 41 and a driven sprocket gear 42 around which a drive chain 43 is trained. The three units of the stack are keyed together and they rotate together.

A corresponding assembly is found on the other side of the box track. Referring to FIG. 1, there is the sprocket gear 26, a belt pulley 44 and a driven sprocket gear 45 around which a drive chain 46 extends.

The left pulley 41 drives the belt 14 which is trained over an idler pulley 47. The pulley 44 drives the belt 15 which extends over an idler pulley 48 (FIGS. 1 and 9).

The drive chains 43 and 46 are driven by drive sprocket gears 49 and 50 mounted on vertical drive shafts 51, 52 extending upwardly from gear boxes driving the shafts 51 and 52 at the same speed, but in opposite directions. Only one gear box 53 is visible in FIG. 9. The other gear box may be seen in FIG. 10 at 59.

The base plates 38 and 39 may be moved closer to or farther away from the bottom conveyor to permit boxes of different width to be handled. A parallelogram type mounting is employed which causes the displacement of the base plates 38, 39 to occur parallel to themselves. This, in turn, insures that the belts 14 and 15 and chains 20 and 21 remain parallel.

Figure 10:
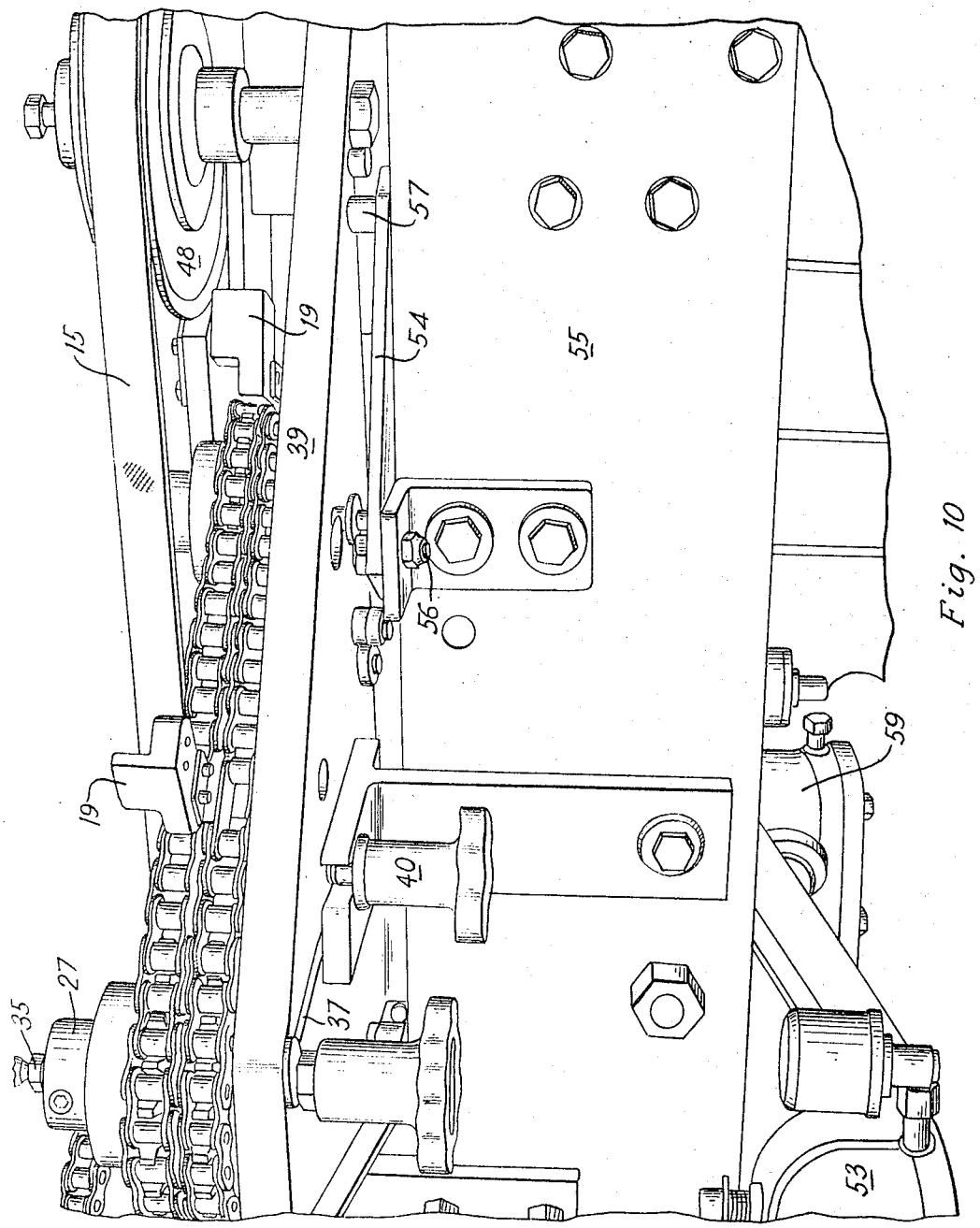
FIG. 10 is a perspective view from below of a portion of the device shown in FIG. 9, FIG. 10 illustrating certain adjusting elements.

Referring to FIG. 10, a link 54 is seen which is pivotally connected to the machine base 55 at 56 and to the base plate 39 at 57. The length of the link 54 measured between its pivot axes is equal to the distance between the drive shaft 52, and the stub shaft 58 on which the stack of gear and pulley units 45, 44, 26 turns. The base plate 39 may therefore be pulled away from the bottom conveyor (after loosening of the nut 40, FIG. 10) causing the shaft 58 to move on an arc about the drive shaft 52. Simultaneously, the far end of the base plate 39 also swings on an arc about the pivot point 56 (FIG. 10).

A corresponding adjustment and mounting mechanism is provided for the other base plate 38.

The gear boxes 53 and 59 are driven from a main shaft 60 by chains 61 and 62, and the bottom conveyors 12, 13 and the outfeed conveyor 28 are driven by chains 63 and 64.

Figure 11:
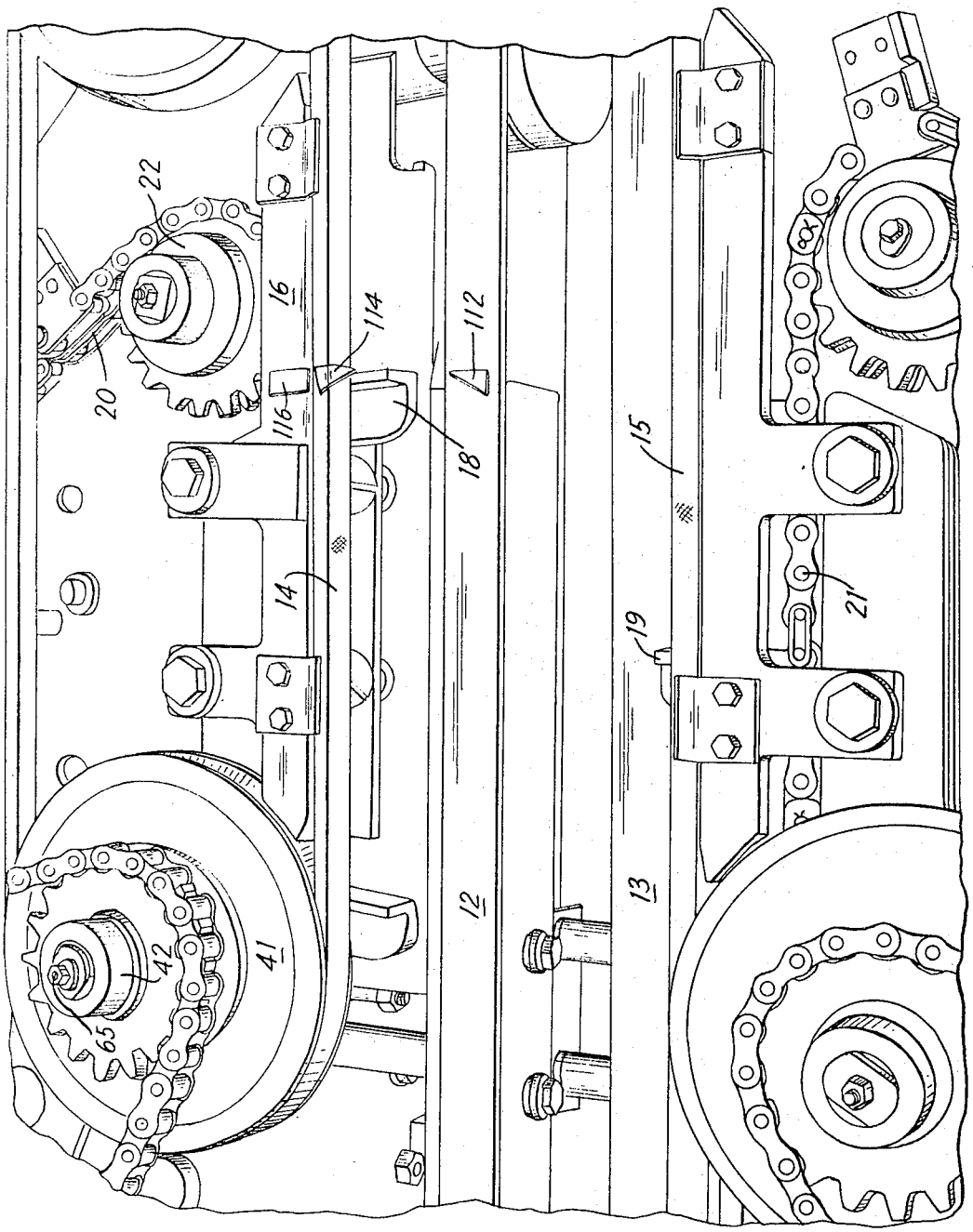
FIGS. 11 and 12 are perspective views of the box track portion of the device illustrating the speed relationship of the various box engaging elements.
Figure 12:
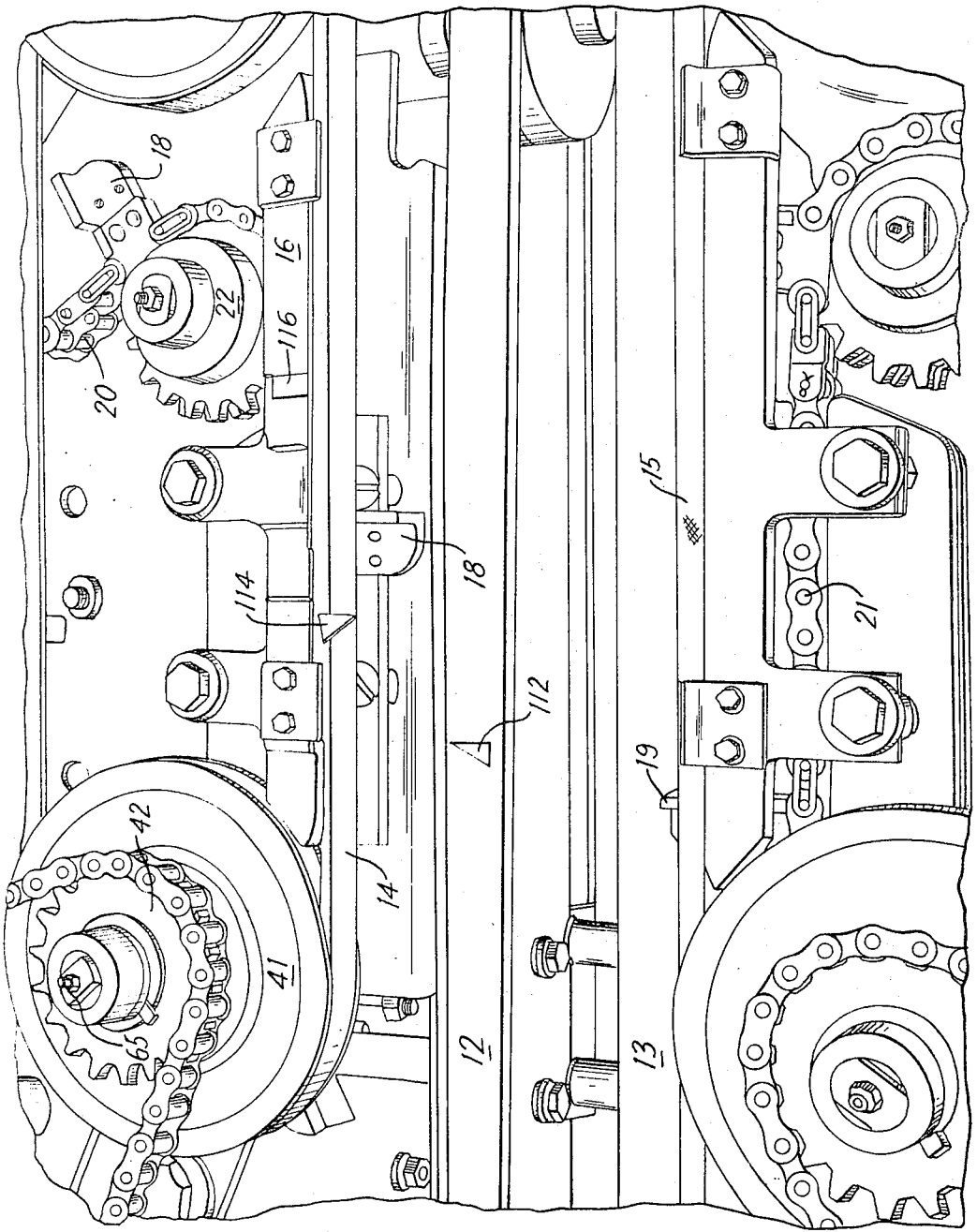

The ratios of transmission and the corresponding velocities are best compared by referring to FIGS. 11 and 12.

In FIG. 11 a marker 116 was attached to the belt guide 16 to serve as a zero mark in line with the position of the lug 18. A marker 114 was attached to the belt 14 and a marker 112 was attached to the bottom conveyor belt 12, all markers being in register. The conveying device was then operated for a brief moment to cause each of the elements 12, 14 and 18 to advance with respect to the zero mark 116.

FIG. 12 shows the result. It is seen that the velocity of the bottom conveyor belt 12 is the highest of all the elements, as its marker 112 advanced the farthest. Next in order is the belt 14, and the lowest velocity is that of lug 18. The numerical ratios can readily be determined by measuring and comparing the relative advances which, measured in millimeters in the photograph from which FIG. 12 was traced, are approximately as follows: 28: 47: 73.

It might at this point be recalled that the illustrated advance of the timing lug is the result of its straight-line travel, and that its velocity increases considerably when the lug enters an arcuate path about the shaft 65. This increase is then sufficient to separate the lug 18 from the box which it engaged.

When it is necessary to convert the device to boxes of a different width, this is readily accomplished by moving the base plates 38 and 39 farther apart or closer together.

Major changes in box length may require installation of timing chains 20, 21 with differently spaced lugs 18, 19. This is readily accomplished by slackening the conveyors by shifting the idler sprocket gears 24 and 27 and then installing the new chains.

The installation of chains 20, 21 with differently spaced lugs 18, 19 may require installation of new drive sprocket gears 49, 50 having the appropriate number of teeth to fit the changed lug opening.

As the total chain length is of necessity a multiple of its lug spacing, the gears 24 and 27 will be in different positions along their slots 36, 37 for chains of different length.

What is claimed is:

1. A device for accelerating rectangular articles, such as folding boxes supplied to it, to a predetermined velocity and for delivering such articles at such velocity in timed and spaced order, the device comprising, in combination, means forming a track along which said articles are movable; a bottom conveyor within said track for frictionally engaging and advancing said articles along said track; a pair of timing conveyors comprising lugs extending into said track on one side and the other, respectively, with respect to the track center, the lugs of each timing conveyor being spaced less than double the length of the articles to be handled and more than the single length of said articles, the lugs on opposite sides of the track center being staggered; means for driving both said timing conveyors at the same linear speed, slower than said bottom conveyor; mounting means for said timing conveyors so disposed as to expose within said track not more than two lugs of one timing conveyor and no more than one lug of the other timing conveyor at any one time; an outfeed conveyor in line with said track and overlapping the terminal portion of said bottom conveyor, said outfeed conveyor comprising lugs extending into said track for receiving and further advancing articles released by the lugs of said timing conveyors; and means for driving said outfeed conveyor at such a linear speed, in relation to the spacing of its lugs, as to move as many lugs into said track per time unit as the total of the timing conveyor lugs moving out of the track per time unit.

2. A device as claimed in claim 1 in which the linear speed of the outfeed conveyor exceeds the linear speed of the bottom conveyor.

3. A device as claimed in claim 1 in which the timing conveyors are disposed in a horizontal plane and in which said outfeed conveyor is disposed in a vertical plane.

4. A device for accelerating rectangular articles, such as folding boxes supplied to it, to a predetermined velocity and for delivering such articles at such velocity in timed and spaced order, the device comprising, in combination, a bottom conveyor for frictionally engaging the bottoms of said articles and advancing said articles; a pair of mounting bases laterally disposed on one and on the other side of said bottom conveyor, respectively; stationary guide means mounted on said bases parallel to said bottom conveyor for guiding opposite sides of articles which are being advanced by said bottom conveyor, said stationary guide means defining an article track of substantially uniform width between them; a timing conveyor mounted on each said base outside said track and comprising lugs extending into said track on opposite sides of said bottom conveyor, the spacing of the lugs of timing conveyors being the same and being less than double the length of the articles and greater than the single length of the articles, the lugs of the two conveyors which extend into the track being staggered, the portions of said timing conveyors which extend parallel to said guide means being so short as to expose within said track no more than two lugs of one conveyor and no more than one lug of the other conveyor at any one time; means for adjusting said bases towards and away from said bottom conveyor, so as to narrow and widen the track, respectively; an outfeed conveyor comprising lugs extending vertically into said track to receive, and further advance, articles released by said timing conveyors; and common drive means for driving both said timing conveyors at the same speed, slower than the bottom conveyor, and for driving said outfeed conveyor at a linear speed so selected in relation to the spacing of its lugs as to move as many outfeed conveyor lugs into the track per time unit as the total of the timing conveyor lugs which move out of the track within said time unit.

5. A device according to claim 4 in which the timing conveyors are mounted on said bases in a substantially horizontal plane, each timing conveyor being trained around three pulleys, so as to form a triangular course, the base of the triangle being parallel to the said guide means and the apex of the triangle being adjustable to accommodate chains of different total length while maintaining unchanged the length of the triangle base.

6. A device according to claim 4 in which the drive means comprises a pair of vertical drive shafts, one for each mounting base; in which each timing conveyor is trained around three pulleys on its respective base, the pulleys having vertical axes of rotation, the axis of one pulley of each mounting base being spaced from the respective drive shaft by a certain distance, and in which the mounting base is hingedly connected to the supporting means of the bottom conveyor by a link element whose length is equal to said certain distance.

References Cited

UNITED STATES PATENTS

| | | | |
|---|---|---|---|
| 3,155,221 | 11/1964 | Griner | 198—34 |
| 3,231,063 | 1/1966 | Talbot | 198—34 |
| 2,816,646 | 12/1957 | Stocking | 198—165 X |
| 2,840,224 | 6/1958 | Lefief | 198—34 |
| 3,037,609 | 6/1962 | Steele et al. | 198—34 |
| 3,352,403 | 11/1967 | Blake | 198—34 |

FOREIGN PATENTS

| | | |
|---|---|---|
| 1,425,309 | 12/1965 | France. |

ANDRES H. NIELSEN, *Primary Examiner.*